Feb. 26, 1957 R. R. PITTMAN 2,783,426
PRECISION MOTOR DRIVE DEVICE
Filed Dec. 20, 1954
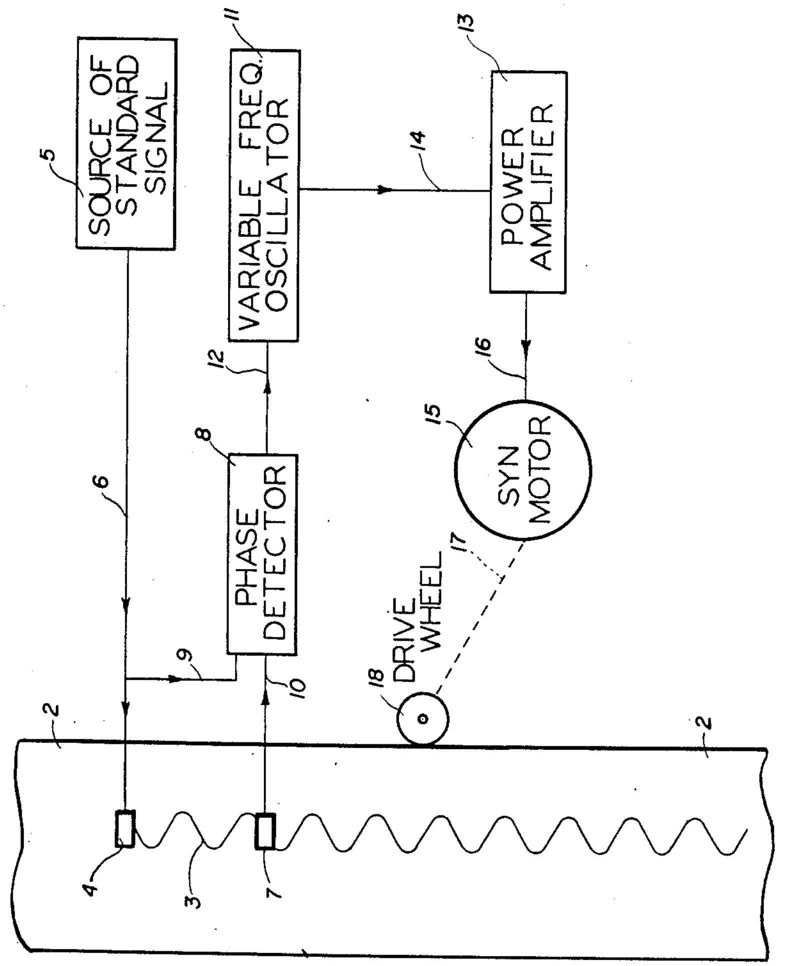
Robert R. Pittman
INVENTOR.
BY Thomas O. Arnold
ATTORNEY United States Patent Office 2,783,426

Patented Feb. 26, 1957

2,783,426

PRECISION MOTOR DRIVE DEVICE

Robert R. Pittman, Houston, Tex., assignor, by mesne assignments, to Southwestern Industrial Electronics Company, Houston, Tex., a corporation of Delaware Application December 20, 1954, Serial No. 476,375

4 Claims. (Cl. 318—171)

This invention relates to improved means for driving any device with a precisely uniform speed.

An object of this invention is to provide improved means for driving any given member or device at precisely uniform speed, and for so doing without the use of prerecorded standard signals.

Other objects are apparent from the following description and accompanying drawing.

The drawing is a schematic representation of a preferred form of the invention.

The invention comprises the combination of means for recording a precisely uniform signal on a record carried by the driven member, means for simultaneously picking up that signal from the record path and comparing the picked up signal with the signal being recorded, and means for driving the driven member in response to the differences between the picked up signal and the recorded signal.

The driven member may be a wheel, a drum, a tape or any other object. In the figure, the driven member is shown to be a tape 2. The tape 2 carries thereon a record or at least a recording channel 3. The recording channel or record 3 may be magnetic, optical, or mechanical and may be either iron, tape, film, disc, cylinder, or the like.

There is a recording head 4 positioned over the record 3 and adapted to record thereon as the driven member 2 and record 3 move thereby.

A signal of precisely uniform frequency is applied to the recording head 4. Conveniently the means for generating such a signal may be a tuning fork oscillator 5 which is connected by a line 6 to the recording head 4. Other sources of uniform frequency signals may also be used.

Positioned over the same recording channel 3, there is also a pickup head 7 adapted to pickup the signal that is being recorded by the recording head 4, simultaneously with that recording. The pickup head 7 is located at a distance from the recording head 4 which is a precise multiple of the wave length of the recorded signal as it appears on the record 3 when it is moving at the desired speed.

Means are provided for comparing the phase of the signal being recorded by the recording head 4 and the signal being picked up by the pickup head 7. This may take the form of a phase detector 8 which is connected to receive the signal being recorded by a line 9, and the signal being picked up by a line 10. The phase detector 8 compares the two signals fed to it and produces an error signal which is indicative of any phase difference between the two signals.

Means for generating a drive signal of frequency determined by that error signal are provided. Conveniently a variable frequency oscillator 11 may be connected by a line 12 to receive the output of the phase detector 8. The frequency of the output of the oscillator 11 is controlled by the error signal put out by the phase detector 8. If the recorded and picked up signals are exactly in phase, then the variable frequency oscillator puts out a signal of a given predetermined frequency. If the picked up signal leads the recorded signal in phase, then the frequency of the output of the oscillator 11 is reduced. If the picked up signal lags the recorded signal in phase, then the frequency of the output of the oscillator 11 is increased.

Normally some means are provided for amplifying the output of the oscillator 11 up to sufficient amplitude to drive the driven member 2. Accordingly, a power amplifier 13 is connected to receive the output of the oscillator 11 by a line 14.

Any convenient means may be used to drive the driven member 2, and the record 3 thereon, in response to the output of the oscillator 11 and amplifier 13. Conveniently a synchronous motor may be used. For example, a synchronous motor 15 may be connected to and powered by the output of the power amplifier 13 by a line 16. This motor 15 may drive a shaft 17 which in turn drives a pinion, gear, or other drive wheel 18. The drive wheel 18 actuates the driven member 2.

Assume, for purposes of illustration, that the desired speed of the driven member past the recording and pickup heads is 10 inches per second, and assume that the record is being driven at precisely this speed by the output of the variable frequency oscillator 11. Assume also that the tuning fork oscillator 5 is generating a uniform standard signal of precisely 40 kc. For the given record speed and given frequency of the standard signal, there is a given wave length of the signal as it appears in the physical form on the record 3. In this example, that wave length is 10/40,000 or .0025 inch. Two inches of space along the record path equals exactly 8,000 wave lengths.

If the facts assumed are true, and the pickup head 7 is located exactly two inches below the recording head 4 on the record path, then the pickup head 7 picks up a signal which is precisely the same in frequency and in phase as the signal being recorded by the recording head 4. The variable frequency oscillator 11 continues to putout the frequency which drives the driven member 2 and record 3 at 10 inches per second.

Now assume that due to momentary loading changes, the speed of the record 3 increases slightly, thereby causing the wave length of the signal as it appears on the record to increase. This in turn means that the pickup head 7 is no longer an exact multiple of the wave length from the recording head 4; the first wave which is a little extra long reaches the pickup head a fraction ahead of the corresponding wave that should be being recorded simultaneously.

The phase detector 8 notes this phase difference, and puts out a signal calculated to slow down the driven member by reducing the frequency of the output of the oscillator 11. Conversely, if the driven member slows down momentarily, then the wave recorded during the slow down reaches the pickup head 7, and hence the phase detector 8, at a time which is later than the time the corresponding wave which is being recorded simultaneously with that pickup. The two signals received by the phase detector 8 being out of phase, the phase detector 8 puts out a signal which increases the frequency of the output of the variable frequency oscillator 11 so as to increase the speed of the driven member 2 and record 3.

By the device here described, a driven member 2 may be driven with speeds substantially as precise as the frequency generated by the uniform frequency source 5. Hunting may be eliminated by giving a large inertia to the driven member 2 and by other means well known in the art.

Modifications may be made in the embodiment of the invention hereinabove described without departure from the scope of the invention. Accordingly, the foregoing description is to be construed as illustrative only, and is not to be construed as any limitation upon the invention as defined in the following claims.

I claim:

1. In combination, a driven member adapted to be driven at some predetermined speed; a record on said driven member; a recording head positioned adjacent said record and adapted to record thereon; a pickup head positioned adjacent said record a predetermined distance along the record path from said recording head and adapted to pickup the signal recorded by said recording head; a tuning fork oscillator connected to supply a precisely uniform frequency signal to said recording head; a phase detector connected to receive said uniform frequency signal and the signal picked up by said pickup head and adapted to put out an error signal indicative of the difference in phase of said two signals; a variable frequency oscillator connected to receive said error signal and adapted to have its output frequency controlled by said error signal; an amplifier adapted to amplify the power of the output of said variable frequency oscillator; a synchronous motor powered by the output of said amplifier and adapted to drive said driven member.

2. In combination, a driven member adapted to be driven at some predetermined speed; a record on said driven member; a recording head positioned adjacent said record and adapted to record thereon; a pickup head positioned adjacent said moving record a predetermined distance along the record path from said recording head and adapted to pickup the signal recorded by said recording head; a source of a uniform frequency signal connected to supply a signal to said recording head; a phase detector connected to receive the signal from said source and the signal picked up by said pickup head and adapted to put out an error signal indicative of the difference in phase of said two signals; a variable frequency oscillator connected to receive said error signal and adapted to generate a signal of a predetermined nominal frequency, which frequency is varied responsive to said error signal; drive means adapted to drive said driven member in response to the frequency of the output of said oscillator.

3. In combination, a record; a recording head adapted to be positioned adjacent said record; a pickup head adapted to be positioned adjacent said record a predetermined distance along the record path from said recording head and adapted to pickup the signal recorded by the recording head; a source of a uniform frequency signal connected to supply a signal to said recording head; a phase detector connected to receive the signal from said source and the signal picked up by said pickup head and adapted to put out an error signal indicative of the difference in phase of said two signals; a variable frequency oscillator connected to receive said error signal and adapted to generate a signal of a predetermined nominal frequency, which frequency is varied responsive to said error signal; drive means adapted to drive said record in response to the frequency of the output of said oscillator.

4. In combination, a driven member; recording means for recording a signal of uniform frequency upon said driven member; pickup means for picking up from said driven member, the signal being recorded, said pickup means being spaced along the record path from said recording means; means for comparing the signal being recorded with the signal being picked up to produce an error signal; means for generating a drive signal of frequency determined by said error signal; and means for driving said driven member in response to said drive signal.

References Cited in the file of this patent

UNITED STATES PATENTS

| | | |
|---|---|---|
| 2,493,103 | Neufeld | Jan. 31, 1950 |
| 2,603,688 | Cole et al. | July 15, 1952 |
| 2,627,596 | Andrews | Feb. 3, 1953 |